United States Patent [19]
Redpath

[11] Patent Number: 5,659,676
[45] Date of Patent: Aug. 19, 1997

[54] SYSTEMS AND METHODS FOR CREATING AND REFRESHING COMPOUND DOCUMENTS

[75] Inventor: Richard Redpath, Cary, N.C.

[73] Assignee: International Business Machines Corporation, Armonk, N.Y.

[21] Appl. No.: 309,046

[22] Filed: Sep. 20, 1994

[51] Int. Cl.[6] .................................................. G06F 17/30
[52] U.S. Cl. ..................... 395/777; 395/603; 364/DIG. 1; 364/225.6
[58] Field of Search ........................... 395/600, 145, 395/146, 147, 161; 364/419.17, 419.19

[56] References Cited

U.S. PATENT DOCUMENTS

| | | | |
|---|---|---|---|
| 4,933,880 | 6/1990 | Borgendale et al. | 395/147 |
| 4,996,662 | 2/1991 | Cooper et al. | 395/600 |
| 5,050,071 | 9/1991 | Harris et al. | 395/600 |
| 5,063,495 | 11/1991 | MacPhail | 395/650 |
| 5,161,223 | 11/1992 | Abraham | 395/600 |
| 5,235,701 | 8/1993 | Ohler et al. | 395/600 |
| 5,252,951 | 10/1993 | Tannenbaum et al. | 345/156 |
| 5,263,167 | 11/1993 | Conner, Jr. et al. | 395/700 |
| 5,297,249 | 3/1994 | Bernstein et al. | 395/156 |
| 5,325,484 | 6/1994 | Motoyama | 395/162 |
| 5,339,392 | 8/1994 | Risberg et al. | 395/161 |
| 5,377,355 | 12/1994 | Hager et al. | 395/650 |

FOREIGN PATENT DOCUMENTS

| | | | |
|---|---|---|---|
| WOA9208199 | 5/1992 | WIPO | G06F 15/40 |
| WOA9303473 | 2/1993 | WIPO | G06F 17/30 |

OTHER PUBLICATIONS

European Search Report, Application No. EP 95 48 0101, The Hague, Jan. 10, 1996, R. Katerbau.

"Advanced Programming in the UNIX Environment", W. Richard Stevens, Addison-Wesley Publishing Company, Inc., Sep. 1992.

*Primary Examiner*—Thomas G. Black
*Assistant Examiner*—John C. Loomis
*Attorney, Agent, or Firm*—Gregory M. Doudnikoff

[57] ABSTRACT

Systems and methods for creating and refreshing compound documents include a query part in a compound document to incorporate data from an independent data processing application. Upon creating or refreshing a document, the query part automatically generates a predetermined command and causes the predetermined independent application to execute the predetermined command. The datastream output which is produced in response thereto is automatically captured and incorporated into the document text to thereby create or refresh the compound document. The need for customized or proprietary links is reduced or eliminated.

30 Claims, 7 Drawing Sheets

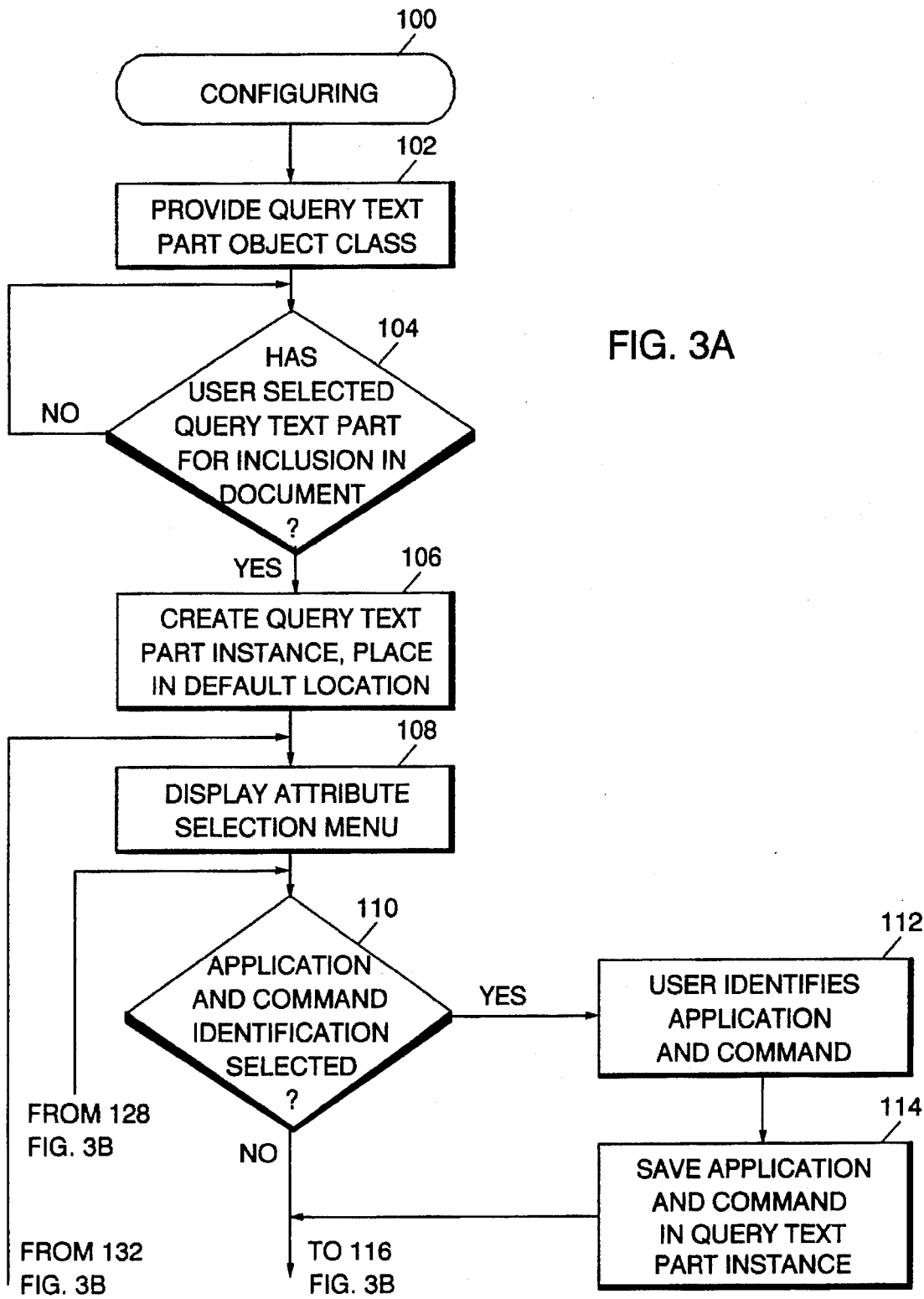

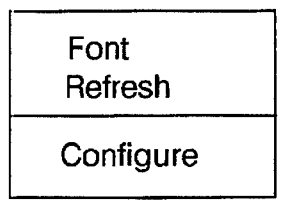

| Untitled | | | | |
|---|---|---|---|---|
| _Document | _Edit | _Background | _Embed | _Help |

Software International                                    50

| DEFECT | COMPONENT | STATUS | OWNER |
|---|---|---|---|
| d197 | sattest | open | angelar |
| d2 | test | closed | orlo |
| d100 | test | closed | orlo |
| d4 | COMP3 | open | orlo |
| d8 | test | closed | orlo |
| d17 | orlo3 | open | orlo |
| d84 | orlo3 | working | orlo |
| d85 | orlo2new | open | orlo |
| d108 | orlo3 | open | orlo |
| d109 | orlo3 | open | orlo |
| d110 | orlo3 | open | orlo |
| d114 | test | open | orlo |

60

The Defect report is shown above for the development cycle as asked for. The report can be updated since the above figure is a Query Text Object.

Sincerely,

John Stevens

SYSTEMS AND METHODS FOR CREATING AND REFRESHING COMPOUND DOCUMENTS

FIELD OF THE INVENTION

This invention relates to data processing systems and methods and more particularly to systems and methods for processing documents on data processing systems.

BACKGROUND OF THE INVENTION

The concept of a document is central to many business operations. A document may be defined as a writing (printed or displayed) which conveys information. Typically, much of the information in a document is conveyed via text. However, documents often include images as well as text. The images may be in the form of graphical information, such as bar charts and pie charts. When documents are created and displayed in a computing environment, the document can also include audio, video and animation to create a multimedia document.

Documents are typically created, stored and manipulated in a computing environment using a word processing software application, such as WordPerfect or Microsoft Word. The word processing application interacts with an underlying operating system, such as OS/2, DOS or Windows in personal computing environments. Word processing and operating systems exist for midrange and mainframe computing environments.

As described above, it is often necessary to incorporate information from other data processing application programs into a document. The other applications may be executing on the same computing platform as the word processing software application, or it may be executing on a different computing platform which is linked via a network. The other application may be a database, spreadsheet, multimedia application, or any other data processing application which can run on a computing platform and which produces data.

Because of the need to incorporate data from other applications into a document, vendors have designed mechanisms for linking a document to other software applications. Unfortunately, these links are typically customized and/or proprietary so that they can only be used to link to specific software applications under specific conditions.

Moreover, existing links do not facilitate refreshing the data which is in the document. For example, upon creation, a document may include data which is obtained from a database. At a later time, upon viewing or printing the document, data in the database may have changed. It is often desired to incorporate the latest data into a document rather than old data. Thus, there is a need to provide a mechanism for refreshing data in a document which is obtained from other applications.

Prior techniques for linking applications to documents include hypertext/hypermedia systems which allow an end user to select a word, phrase or graphical object, and thereby cause one or more associated information entities to be obtained. Unfortunately, hypertext systems are typically hard coded by a software developer and do not allow a document processing system to obtain data from other standard software applications. An example of a hypertext system is found in U.S. Pat. No. 5,297,249 to Bernstein et al. entitled *"Hypermedia Link Marker Abstract and Search Services"*, assigned to the Assignee of the present invention.

Other attempts have been made to incorporate data from other applications into documents by establishing proprietary links between computer programs. For example, Microsoft Object Linking and Embedding (OLE) allows customized links to be created between certain applications and a document using proprietary linking techniques. Other customized linking systems are described in U.S. Pat. No. 5,235,701 to Ohler et al. entitled *"Method of Generating and Accessing a Database Independent of Its Structure and Syntax"*; U.S. Pat. No. 5,263,167 to Conner, Jr. et al. entitled *"User Interface for a Relational Database Using a Task Object for Defining Search Queries in Response to a Profile Object Which Describes User Proficiency"*; and U.K. Patent Application GB-2 242 293 A to Heninger entitled *"Apparatus and Method for Dynamic Linking of Computer Software Components"*. Unfortunately, while such customized linking schemes may be usable with some software applications, they are not usable with a wide variety of independent personal computer, midrange and mainframe applications which produce data.

SUMMARY OF THE INVENTION

It is therefore an object of the invention to provide improved systems and methods for creating and refreshing documents.

It is another object of the present invention to provide document creating and refreshing systems and methods which can interface with many independent data processing applications.

These and other objects are provided according to the present invention by systems and methods for creating and refreshing compound documents which are based upon the recognition that almost all applications are responsive to commands and produce a datastream output in response to commands. According to the invention, a query part is included in a compound document to incorporate data from an independent data processing application. The query part automatically generates the predetermined command and causes the predetermined independent application to execute the predetermined command. The datastream output which is produced in response thereto is automatically captured and is incorporated into the document text to thereby create or refresh the compound document.

Hard coded and/or proprietary links are not required in order to incorporate data from independent data processing applications into a compound document. As long as the independent data processing application produces a datastream output in response to predetermined commands, the document query part can be configured to generate the predetermined command and capture the resultant datastream output and automatically incorporate the datastream output into the document text. Systems and methods for efficiently creating compound documents using a wide variety of independent software applications are provided thereby.

In particular, according to the invention, a compound document is created in a computing environment including a computing platform which runs a plurality of independent data processing applications, each of which produces datastream outputs in response to predetermined commands. A compound document is configured to include a document text and a query part, with the query part comprising a datastream output from a selected one of the plurality of independent applications which is produced in response to a predetermined command. After configuration, and in response to a user request, the predetermined command is automatically generated and the predetermined independent application is caused to execute the predetermined command. The datastream output which is produced by the predetermined application in response to the automatically generated predetermined command is automatically captured. The automatically captured datastream output is automatically incorporated into the document text to thereby create a compound document.

Automatic command generating is also performed in response to a request to refresh a document. Thus, any time a user is viewing a document, the user can cause a refresh command to be executed. Alternatively, the refresh request may result from expiration of a timer so that a compound document is automatically periodically refreshed. As another alternative, a refresh request is automatically generated when a compound document is retrieved from storage. In response to a refresh request, the present invention automatically generates the predetermined command, captures the datastream output and incorporates the datastream into the document text so that a current version of all the data is present. Upon refreshing a document, old versions of the datastream output may be retained in the compound document to thereby retain a record of drafts of the compound document. Alternatively, old versions of the datastream output may be deleted and replaced by the current version.

According to other aspects of the invention, when configuring the compound document, user identifications of the predetermined application and predetermined command are accepted. User identification of fonts and other rendering attributes for the datastream output are also accepted.

The present invention uses command structures and datastream outputs which are commonly found in data processing applications. Moreover, the ability to send a command to an independent data processing application, and to accept a datastream output which results therefrom, is provided in many current operating systems, such as OS/2, UNIX and Windows/NT. For example, the command may be automatically generated by registering a stream pipe with the operating system, and the datastream output may be automatically captured by connecting the datastream output to the stream pipe. Thus, compound documents can be created using existing operating systems and existing applications without the need for customized or proprietary links.

BRIEF DESCRIPTION OF THE DRAWINGS

FIGS. 3A and 3B are flow charts illustrating detailed operations for configuring a compound document according to the present invention.

FIG. 7 illustrates an example of an attribute selection menu according to the present invention.

FIG. 8 illustrates an example of a compound document according to the present invention.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
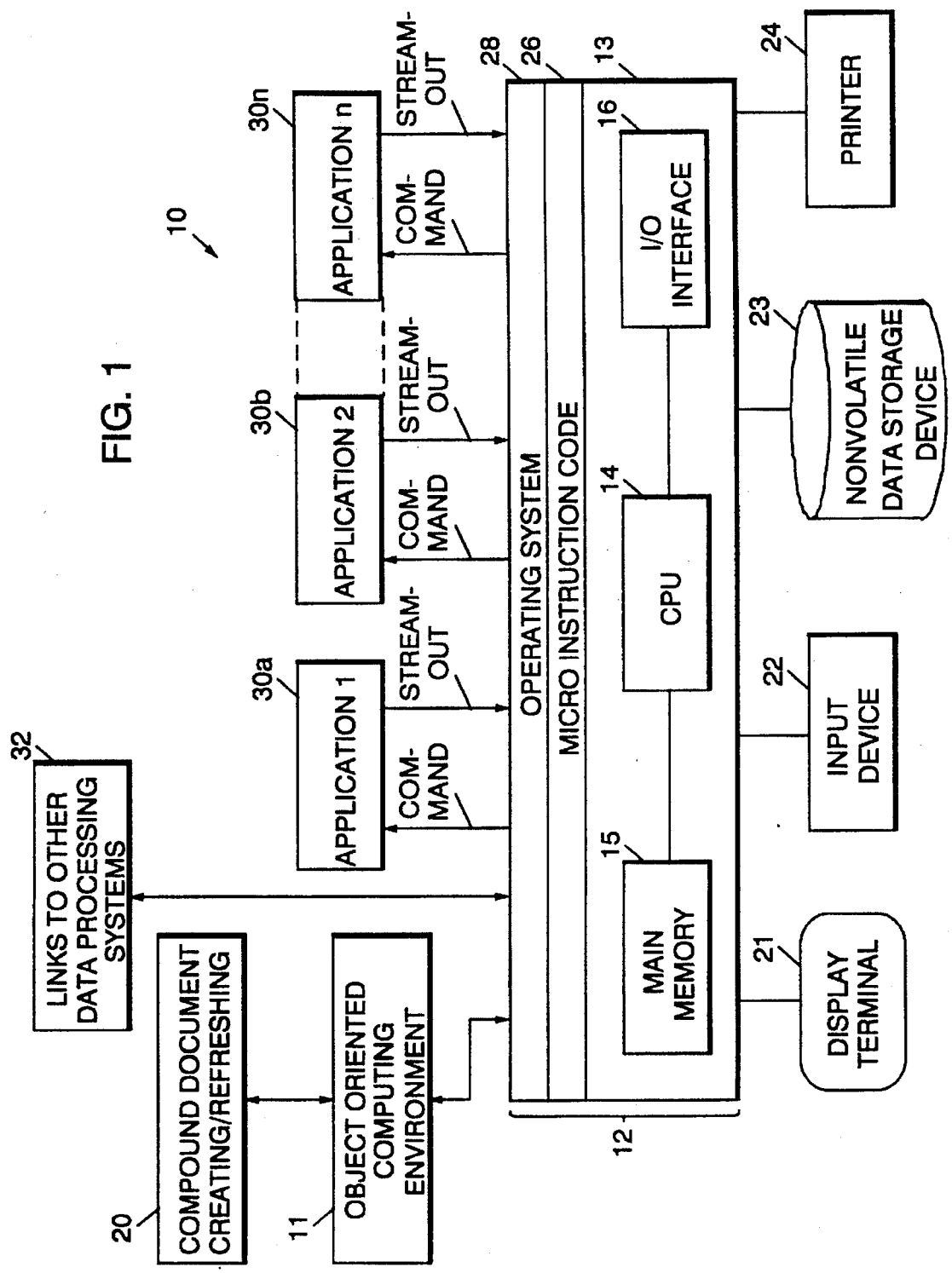
FIG. 1 schematically illustrates a hardware and software environment in which the present invention may operate.

Referring now to FIG. 1, a hardware and software environment in which the present invention may operate will now be described. As shown in FIG. 1, the present invention is a method and system for creating and revising compound documents in a computing environment 10 which operates on one or more computing platforms 12. It will be understood by those having skill in the art that computing platform 12 typically includes computer hardware units, such as a central processing unit (CPU) 14, a main memory 15, and an input/output (I/O) interface 16, and may include peripheral components such as a display terminal 21, an input device 22 such as a keyboard or a mouse, nonvolatile data storage devices 23 such as magnetic or optical disks, printers 24 and other peripheral devices. Computing platform 12 also typically includes microinstruction codes 26 and an operating system 28.

Computing platform 12 may be implemented using an Enterprise System Architecture/370 (also called an "ESA/370") or an Enterprise System Architecture/390 (also called an "ESA/390") mainframe computer, a midrange computer such as an Application System/400 (also called an "AS/400") or a personal computer such as a PS/2 or PS/1 personal computer, all available from the International Business Machines Corporation (IBM), or other conventional computer platforms. It will also be understood by those having skill in the art that computing platform 12 may operate across multiple computer systems. Operating system 28 may be an IBM Multiple Virtual Storage (MVS) operating system or an appropriate personal computer operating system such as DOS, Windows/NT, UNIX or OS/2, or any other conventional operating system.

As those skilled in the art are well aware, a compound document for a data processing system is implemented with computer readable code, also known as software. The flowcharts discussed below describe the logical steps carried out by software implementing the present invention. Software program code is typically stored in the memory of a workstation or other data processing system. The software program code may be embodied on any of a variety of known media for use with a data processing system, such as a diskette or CD-ROM. The software may be distributed on such media, or may be distributed to users from the memory of one computer system over a network of some type to other computer systems for use by users of such other systems. Such techniques and methods for embodying the software code on media and/or distributing software code are well known, and will not be further discussed herein.

The present invention is preferably implemented in a object oriented computing environment 11. As is well known to those having skill in the art, in an object oriented computing environment, work is accomplished by sending action request messages to an object which contains data. The object will perform a requested action on the data according to its predefined methods. Objects may be grouped into object classes which define the types and meanings of the data, and the action requests (messages) that the object will honor. The individual objects containing data are called instances of the object class. Object classes can be defined to be subclasses of other classes. Subclasses inherit all the data characteristics and methods of the parent class. They can add additional data and methods and they can override or redefine any data elements or methods of the parent class. Object oriented computing environment 11 may be implemented using object oriented languages such as C++ and Smalltalk. Object oriented computing environment 11 is well known to those having skill in the art and need not be described further herein.

Although compound document creating methods and systems of the present invention may operate with any conventional document creating system, it is preferably implemented using the OpenDoc architecture for compound document construction. As is well known to those having skill in the art, the OpenDoc architecture was created as a result of a joint collaboration between Apple Computer, IBM and WordPerfect, and delivers a new paradigm for creating documents by enabling multiple applications to work on the same document.

Still referring to FIG. 1, a plurality of independent data processing (software) applications 30a–30n operate on system 10. Each independent data processing application typically interfaces with operating system 28. Examples of data processing applications 30a–30n are spreadsheets, database, graphics, multimedia and other data processing applications which can run on personal computers, midrange computers and mainframe computers.

Although the design of application programs 30a–30n vary widely, it has been recognized according to the present invention that application programs are typically command driven. In other words, an application program performs data processing operations in response to a command. The command syntax is typically unique for each independent data processing application. However, almost all data processing applications are responsive to commands. Similarly, although each data processing application 30a–30n will produce unique outputs depending upon the data which is being processed and the results thereof, the outputs are typically produced in the form of a datastream output, also referred to as a datastream or simply a stream. The datastream output is typically captured by an operating system for display on display 21 or printing on printer 24. It will be understood by those having skill in the art that an application can produce a stream of output which, under an operating system control (a pseudo device) can be redirected to another application. The term "stream" refers to the output data produced by an application. In a simple sense, the stream is in line format. The term "stream" includes all channels which are configured by the operating system, such as printing or displaying. Streams are often produced in one of three forms: standard input, standard output and standard error. See the Textbook entitled *Advanced Programming in the UNIX® Environment* by W. Richard Stevens, published by Addison Wesley Publishing Company, Inc., 1992, Chapter 5 entitled *"Standard I/O Library"*, the disclosure of which is hereby incorporated herein by reference.

It will also be understood by those having skill in the art that applications 30a–30n need not reside on the same computing platform 12 as the compound document creating and revising system 20. In particular, the operating system may contain links to other data processing systems 32. These links may be formed using local area networks, wide area networks, client/server systems or other well-known computer linking systems. Thus, operating system 28 may send commands to other computer platforms via links 32 and may receive datastream outputs from other computer platforms via links 32.

Figure 2:
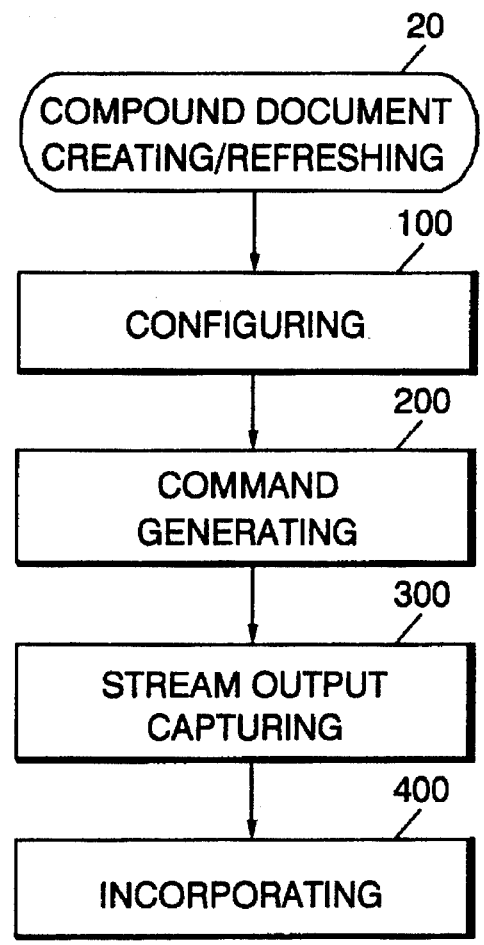
FIG. 2 is a flow chart illustrating operations for creating and refreshing compound documents according to the present invention.

Referring now to FIG. 2, compound document creating and refreshing system and method 20 generally includes configuring operation 100, command generating operation 200, datastream output capturing operation 300 and incorporating operation 400. In general, configuring operation 100 configures a compound document including a document text and a query part. The query part comprises data from at least a selected one of the plurality of independent applications 30a–30n which is produced in response to a predetermined command.

The command generating operation 200 is responsive to the configuring operation 100 and to a user request to generate a document. Preferably, configuring operation 100 accepts user identification of the selected one of the predetermined applications 30a–30n and of the predetermined command. User identification of fonts and other rendering attributes for the datastream output are also accepted. Command generating operation 200 automatically generates the predetermined command and causes the predetermined independent application 30a–30n to execute the predetermined command. As will be described below, command generating operation 200 preferably uses operating system 28 for generating the command.

Datastream output capturing operation 300 automatically captures the datastream output which is produced by the predetermined application in response to the automatically generated predetermined command which is executed thereby. Datastream output capturing operation 300 preferably also utilizes the functionality of operating system 28.

Finally, incorporating operation 400 is responsive to the capturing operation for automatically incorporating the datastream output into the document text to thereby create the compound document. Incorporating operation 400 preferably incorporates the datastream output into the document text using the user-identified fonts and other rendering attributes. The datastream output may be incorporated into the document text in at least two ways. Old versions of the datastream output may be retained to thereby maintain drafts in the compound document. Alternatively, the current version may replace old versions of the datastream output.

A document can also be refreshed at any time. In order to refresh the document, operations 200, 300 and 400 are activated in response to a refresh command which is applied to a preexisting compound document. A user may initiate a refresh. Alternatively, refresh may be automatically performed periodically. Alternatively, refresh may be performed automatically upon retrieval, displaying or printing a compound document.

Figure 3B:
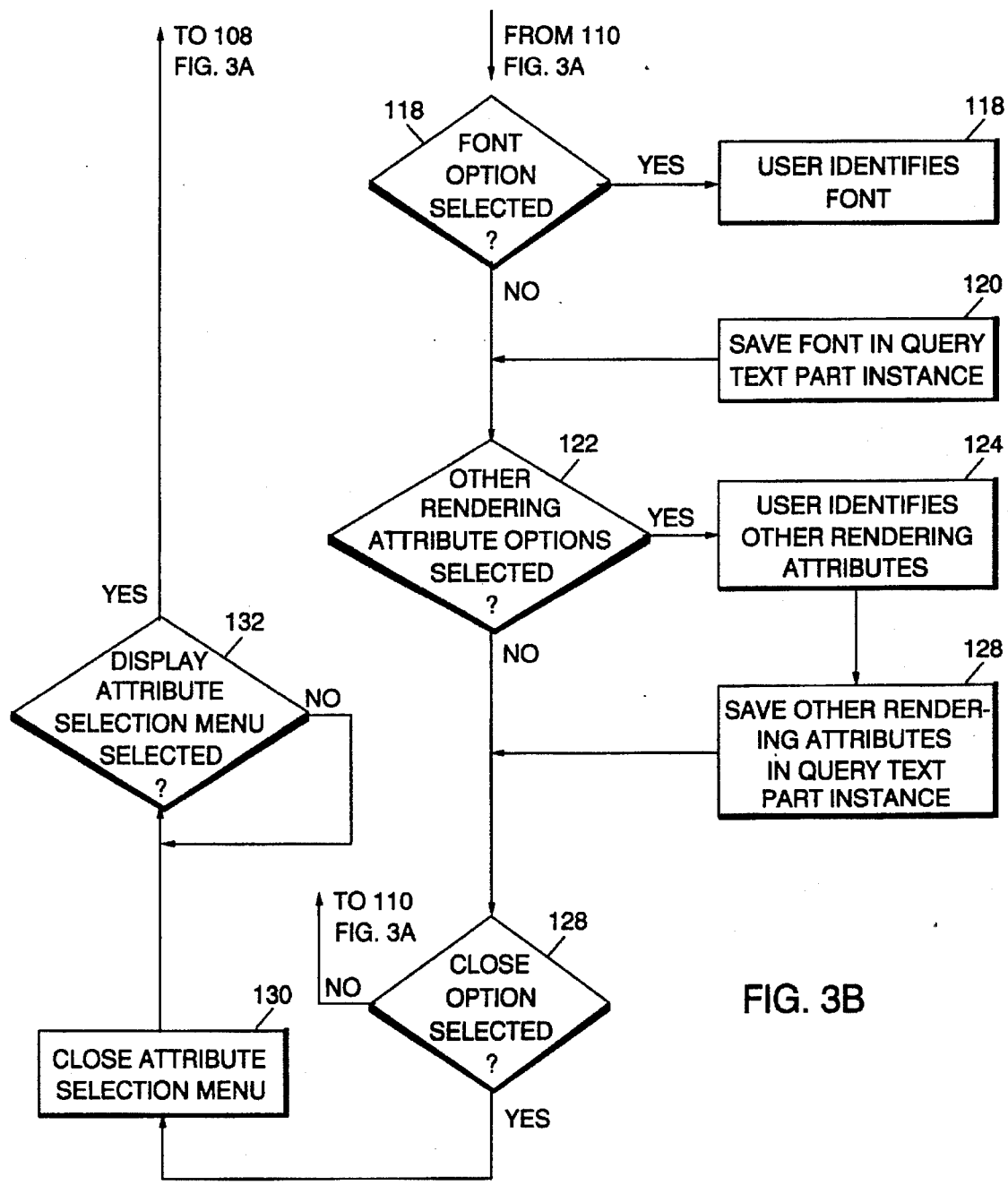

Referring now to FIGS. 3A and 3B, operations for implementing the configuration operation 100 of FIG. 2 will now be described. The description assumes that the compound document creating and revising system and method 20 (FIG. 1) is implemented in an object oriented computing environment. As such, at Block 102, the query text part is provided as an object class within the document processing system. The query text part object class has the methods described below. When a particular query text part is specified, the user is, in effect, defining an instance of the class object which includes the attributes for use in the specific document and the incorporated data.

Still referring to FIGS. 3A and 3B, at Block 104 a query is made as to whether the user has selected the query text part for inclusion in a document. If the user has selected a query text part for inclusion in the document, then at Block 106 a query text part instance is created and a query text part window is placed in a default location within a document, for example in the lower left corner of a document, at Block 106. An attribute selection menu is then displayed at Block 108. FIG. 7 illustrates an example of an attribute selection menu.

Upon selection of the source and command identification option at Block 110, user identification of the predetermined application (also referred to as the source) and the predetermined command which is to be executed is accepted at Block 112. It will be understood by those having skill in the art that as defined herein, an application (also referred to as a "process") is any entity, such as application software or a communication link, operating system or batch file which can generate a datastream output.

The application and command identifications are saved in the query text part instance at Block 114. If the user selects font options at Block 116, then the user identifies the fonts to be used in rendering the datastream output at Block 116 and the selected fonts are saved in the query text part instance at Block 120. If other rendering attributes are selected at Block 122, then the user identifies other rendering attributes, such as the size of the object within the document, the position of the object within the document, and other display choices. These other rendering attributes are saved in the query text part instance at Block 128.

Still referring to FIGS. 3A and 3B, upon selection of the close option at Block 128, the attribute selection menu is closed at Block 130 and configuration is complete unless the user selects to display the attribute selection menu again at Block 132. As already described, earlier versions of the datastream output may be saved as drafts, or earlier versions may be replaced by the current version.

Figure 4:
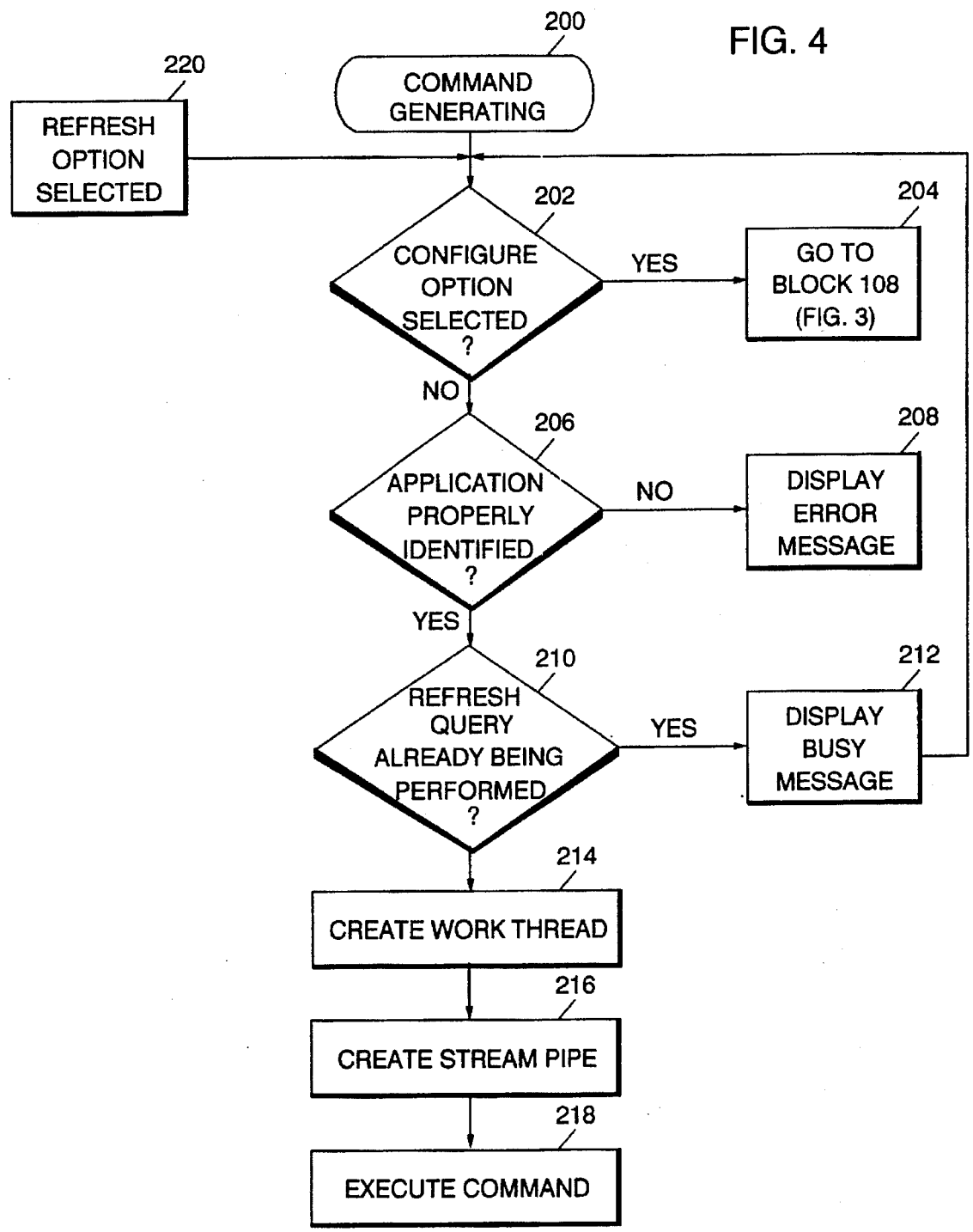
FIG. 4 is a flow chart illustrating detailed operations for generating commands according to the present invention.

Referring now to FIG. 4, operations for generating commands (Block 200 of FIG. 2) will now be described. Command generating operations begin after configuration has completed at the conclusion of FIGS. 3A and 3B, and the configure option is no longer selected at Block 202. As long as the configuration option is selected, the operations of FIGS. 3A and 3B will be performed at Block 204. It will also be understood by those having skill in the art that the command generating operations 200 may also be initiated in response to selection of a refresh option at Block 220. While a document is being viewed, it may be refreshed at any time. The data contained in the application at creation may be updated to its current value. As described above, refresh may also be automatically performed periodically, or automatically performed upon document retrieval, display or printing.

Continuing with the description of FIG. 4, a test is made at Block 206 to ensure that the application has been properly identified. It will be understood by those having skill in the art that the application identification can also require user input parameters for each refresh request, i.e. each execution of the object. For example, in a banking Setting, the appropriate account number may be required each time, as part of the application identification. If the application is not properly identified, then an error message is displayed at Block 208 and configuration is entered at Block 204.

At Block 210, a check is made as whether a refresh or query is already being performed. If so, a busy message is displayed at Block 212. If not, then a work thread is created at Block 214. A work thread is preferably a Light Weight Process (LWP) which only ties up refresh related methods during refresh processing. LWP attributes other than source or refresh related attributes can be modified and other parts can be manipulated during execution of this thread. The LWP is instance-bound, thus making multi-tasking possible.

After the work thread is created, a stream pipe is created at Block 216. The stream pipe is a communications link to the operating system. The pipe is registered with the operating system and will receive from the operating system all outputs supplied to the operating system from any application output or data dump initiated by an application command which is communicated to the application. The command is then executed at Block 218. It will be understood by those having skill in the art that work thread creation, stream pipe creation and execution of commands (Blocks 214, 216 and 218 respectively) are conventional data transfer techniques of many operating systems. Operations then wait until the screen output is captured (Block 300 of FIG. 2).

Figure 5:
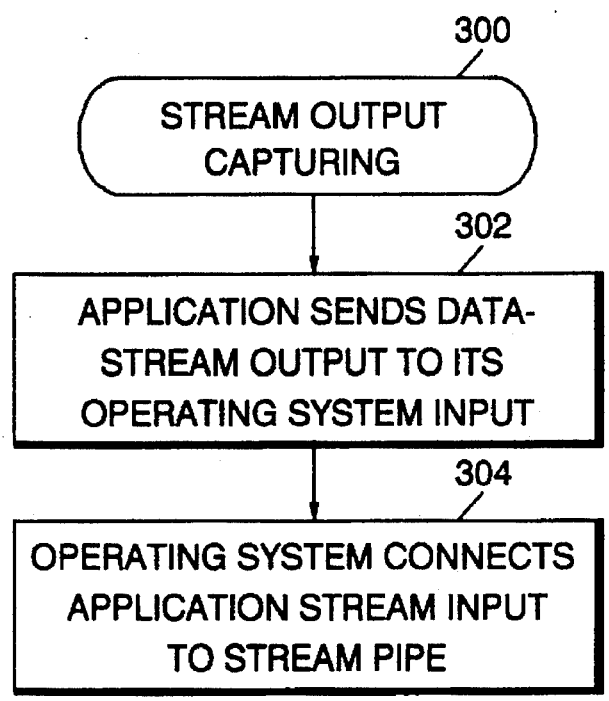
FIG. 5 is a flow chart illustrating detailed operations for capturing datastream outputs according to the present invention.

Referring to FIG. 5, upon completion of processing by the application, the application sends its datastream output to its operating system output at Block 302. The operating system connects the datastream output to the stream pipe at Block 304, thus capturing the datastream output.

Figure 6:
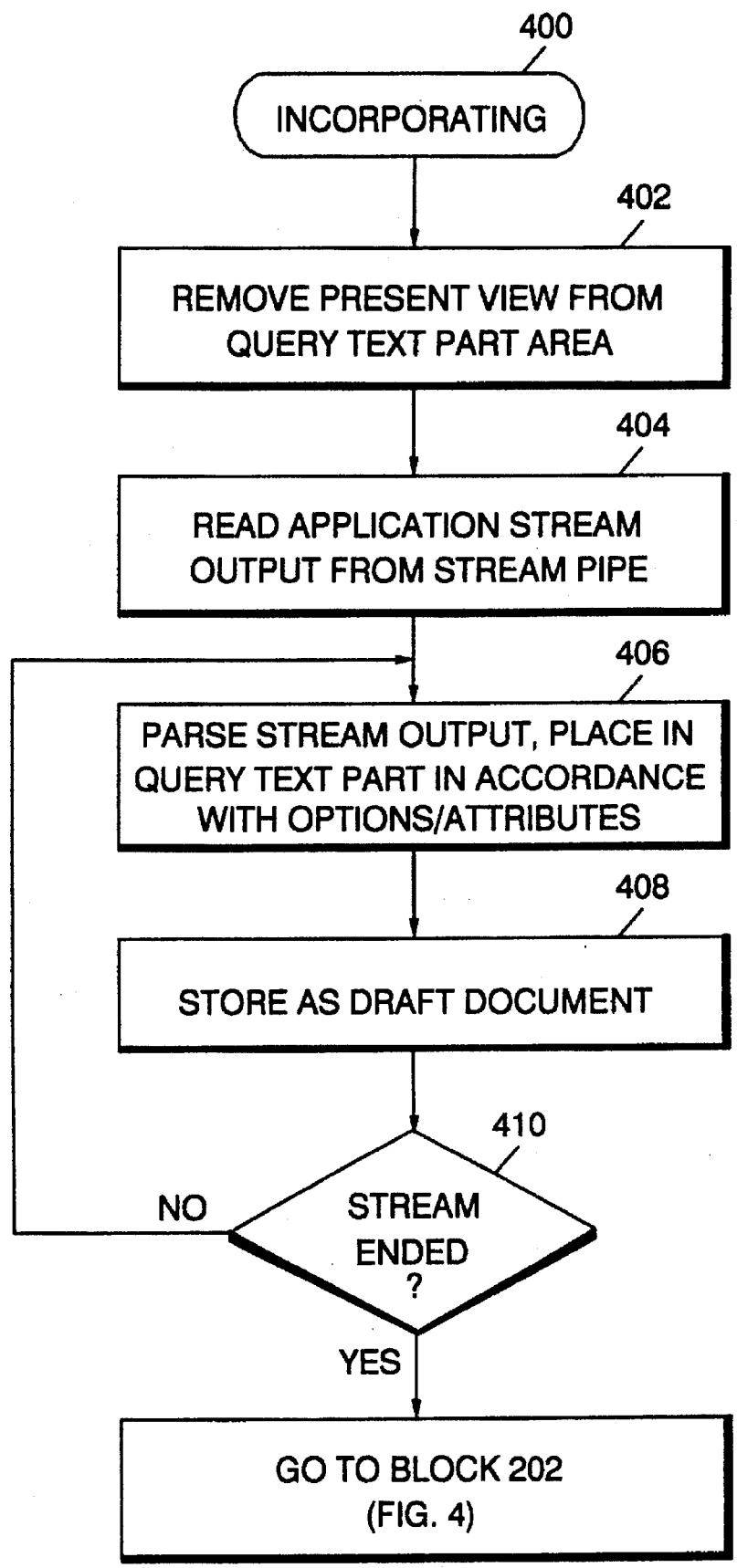
FIG. 6 is a flow chart illustrating detailed operations for incorporating datastream outputs according to the present invention.

Referring now to FIG. 6, operations for incorporating the captured datastream output into the document (Block 400 of FIG. 2) will now be described. If there is a present view of the data or text in the query text part area of the document, it is removed at Block 402. The datastream output is read from the stream pipe at Block 404. At Block 406, the incoming data and text is parsed and placed in the query text part area of the document in accordance with the rendering attributes which were previously selected at Block 406. FIG. 8 illustrates a document 50 including an incorporated datastream in a query text part 60.

The query text part is then stored as part of a draft document at Block 408, if the user has so specified. The draft document may be stored at Block 408 or may be stored when the document is closed. The draft is preferably stored in a Distributed Computing Environment (DCE) within the document rather than in an external file. At Block 410, if the stream of data has ended, processing returns to Block 202 of FIG. 4 at Block 412.

To summarize the above operations, the query text part object first establishes a pipe with an operating system. An operating system command is then sent to the application (source entity) for execution by the operating system. The application, in response to the command, outputs the stream to the operating system output. The operating system then establishes a channel to the pipe and sends the stream there. Thus, compound document creating and revising systems and methods of the present invention can use established operating system communications techniques to communicate to any application which generates a datastream output. This contrasts sharply with known techniques which modify the applications themselves to be able to participate in a compound document paradigm. The application software need not be modified to pull data into the compound document. Existing application software can therefore be used within the document paradigm without extensive code rewrites.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. In a computing environment including a computing platform which runs a plurality of independent data processing applications and which supports compound documents, a part for use with a compound document comprising:

means for establishing an interface to receive data from a selected one of said plurality of independent applications which is to be included in said compound document;

means for requesting that said selected data processing application send the data via the interface; and means for incorporating the data which is sent via the interface into the compound document.

2. A part according to claim 1 wherein said incorporating means comprises means for incorporating the datastream output into said document text using user identified fonts and other rendering attributes.

3. A part according to claim 1 wherein said requesting means is responsive to a request to refresh the document.

4. A part according to claim 1 further comprising means, responsive to said incorporating means, for displaying, printing and storing said compound document, including the incorporated data.

5. A method for refreshing a compound document in a computing environment, said computing environment including a computing platform which runs a plurality of independent data processing applications, each of which produces datastream outputs in response to commands, said compound document including a document text and a query part, said query part comprising a datastream output from a selected one of said plurality of independent applications which is produced in response to a predetermined command, said compound document refreshing method comprising the steps of:

automatically generating said predetermined command in response to a refresh request;

automatically causing said predetermined independent application to execute said predetermined command;

automatically capturing the datastream output which is produced by said predetermined application in response to the automatically generated predetermined command which is executed thereby; and automatically incorporating said datastream output into said document text, to thereby refresh said compound document.

6. A method according to claim 5 wherein said data processing system includes an operating system, wherein said automatic generating step comprises the step of registering a stream pipe with said operating system, and wherein said capturing step comprises the step of connecting said datastream output to said stream pipe.

7. A method according to claim 5 wherein said refresh request is generated in response to at least one of a user refresh command, an automatically periodically generated refresh command, and a user command to display, print, or retrieve said compound document.

8. A method according to claim 5 wherein said incorporating step further comprises the step of retaining an earlier version of said datastream output portion in said compound document, to thereby produce a draft compound document.

9. A method according to claim 5 wherein said incorporating means further comprises the step of deleting an earlier version of said datastream output.

10. A method for creating a compound document in a computing environment, said computing environment including a computing platform which runs a plurality of independent data processing applications, each of which produces datastream outputs in response to commands, said compound document creating method comprising the steps of:

configuring a compound document including a document text and a query part, said query part comprising a datastream output from a selected one of said plurality of independent applications which is produced in response to a predetermined command;

automatically generating said predetermined command in response to a user request;

automatically causing said predetermined independent application to execute said predetermined command;

automatically capturing the datastream output which is produced by said predetermined application in response to the automatically generated predetermined command which is executed thereby; and automatically incorporating said datastream output into said document text, to thereby create said compound document.

11. A method according to claim 10 wherein said compound document configuring step comprises the step of accepting user identification of said selected one of said predetermined applications and for accepting user identification of said predetermined command.

12. A method according to claim 11 wherein said compound document configuring step further comprises the step of accepting user identification of fonts and other rendering attributes for said query part.

13. A method according to claim 12 wherein said automatic incorporating step comprises the step of incorporating at least part of said datastream output into said document text using the user identified fonts and other rendering attributes.

14. A method according to claim 13 wherein said automatic generating step is responsive to a request to refresh the document.

15. A method according to claim 10 wherein said data processing system includes an operating system, wherein said automatic generating step comprises the step of registering a stream pipe with said operating system, and wherein said capturing step comprises the step of connecting said datastream output to said stream pipe.

16. A system for creating a compound document in a computing environment, said computing environment including a computing platform which runs a plurality of independent data processing applications, each of which produces datastream outputs in response to commands, said compound document creating system comprising:

means for configuring a compound document including a document text and a query part, said query part comprising at least a portion of a datastream output from a selected one of said plurality of independent applications which is produced in response to a predetermined command;

means, responsive to said configuring means and to a user request, for automatically generating said predetermined command and for causing said predetermined independent application to execute said predetermined command;

means, responsive to said automatic command generating means, for automatically capturing the datastream output which is produced by said predetermined application in response to the automatically generated predetermined command which is executed thereby; and means, responsive to said capturing means, for automatically incorporating said datastream output into said document text, to thereby create said compound document.

17. A system according to claim 16 wherein said compound document configuring means comprises means for accepting user identification of said selected one of said predetermined applications and for accepting user identification of said predetermined command.

18. A system according to claim 17 wherein said compound document configuring means further comprises means for accepting user identification of fonts and other rendering attributes for said query part.

19. A system according to claim 18 wherein said automatic incorporating means comprises means for incorporating said datastream output into said document text using the user identified fonts and other rendering attributes.

20. A system according to claim 19 wherein said automatic generating means is responsive to a request to refresh the document.

21. A system according to claim 16 wherein said data processing system includes an operating system, wherein said automatic generating means comprises means for registering a stream pipe with said operating system, and wherein said capturing means comprises means for connecting said datastream output to said stream pipe.

22. A system according to claim 16 wherein said automatic command generating means is further responsive to user input parameters, for automatically generating said predetermined command including said user input parameters.

23. A system according to claim 16 further comprising means, responsive to said incorporating means, for displaying, printing and storing said compound document, including said document text and said datastream output.

24. A system for refreshing a compound document in a computing environment, said computing environment including a computing platform which runs a plurality of independent data processing applications, each of which produces datastream outputs in response to commands, said compound document including a document text and a query part, said query part comprising a datastream output from a selected one of said plurality of independent applications which is produced in response to a predetermined command, said compound document refreshing system comprising:

means, responsive to a refresh request, for automatically generating said predetermined command and for causing said predetermined independent application to execute said predetermined command;

means, responsive to said automatic command generating means, for automatically capturing the datastream output which is produced by said predetermined application in response to the automatically generated predetermined command which is executed thereby; and means, responsive to said capturing means, for automatically incorporating said datastream output portion into said document text, to thereby refresh said compound document.

25. A system according to claim 24 wherein said automatic command generating means is further responsive to user input parameters, for automatically generating said predetermined command including said user input parameters.

26. A system according to claim 24 wherein said data processing system includes an operating system, wherein said automatic generating means comprises means for registering a stream pipe with said operating system, and wherein said capturing means comprises means for connecting said datastream output to said stream pipe.

27. A system according to claim 24 further comprising means, responsive to said incorporating means, for displaying, printing and storing said compound document, including said document text and the at least part of said datastream output.

28. A system according to claim 24 wherein said refresh request is generated in response to at least one of a user refresh command, an automatically periodically generated refresh command, and a user command to display, print, or retrieve said compound document.

29. A system according to claim 24 wherein said incorporating means further comprises means for retaining an earlier version of said datastream output in said compound document, to thereby produce a draft compound document.

30. A system according to claim 24 wherein said incorporating means further comprises means for deleting an earlier version of said datastream output.

* * * * *